United States Patent
Schroeder

(10) Patent No.: US 12,150,397 B2
(45) Date of Patent: Nov. 26, 2024

(54) SYSTEM AND METHOD FOR MONITORING AN OPERATIONAL STATUS OF A SHEAR PIN FOR A GROUND-ENGAGING ASSEMBLY OF AN AGRICULTURAL IMPLEMENT

(71) Applicant: CNH Industrial America LLC, New Holland, PA (US)

(72) Inventor: Brittany Schroeder, Lowell, IN (US)

(73) Assignee: CNH Industrial America LLC, New Holland, PA (US)

( * ) Notice: Subject to any disclaimer, the term of this patent is extended or adjusted under 35 U.S.C. 154(b) by 728 days.

(21) Appl. No.: 17/206,356

(22) Filed: Mar. 19, 2021

(65) Prior Publication Data
US 2022/0295683 A1 Sep. 22, 2022

(51) Int. Cl.
*A01B 61/04* (2006.01)
*A01B 3/24* (2006.01)
(Continued)

(52) U.S. Cl.
CPC ............ *A01B 61/042* (2013.01); *A01B 3/24* (2013.01); *A01B 35/24* (2013.01); *A01B 35/32* (2013.01); *G01B 7/30* (2013.01); *G01D 5/16* (2013.01)

(58) Field of Classification Search
CPC ........... A01B 35/32; A01B 35/24; A01B 3/24; A01B 61/042; G01B 7/30; G01D 5/16
See application file for complete search history.

(56) References Cited

U.S. PATENT DOCUMENTS 523,597 A * 7/1894 Ryder .................. A01B 61/042
172/271
1,207,507 A * 12/1916 Crawford ............. A01B 61/042
172/710
(Continued)

FOREIGN PATENT DOCUMENTS

| CN | 102289644 A | 12/2011 |
| CN | 103630282 A | 3/2014 |

(Continued)

OTHER PUBLICATIONS

Extended European Search Report for corresponding EP Application No. 22162270.7 Dated Aug. 17, 2022 (9 pages).
(Continued)

*Primary Examiner* — Thomas B Will
*Assistant Examiner* — Joel F. Mitchell
(74) *Attorney, Agent, or Firm* — Rebecca Henkel; Rickard DeMille; Peter Zacharias

(57) ABSTRACT

A system for monitoring the operational status of shear pins for ground-engaging assemblies of agricultural implements includes a ground-engaging assembly including an attachment structure pivotably coupling the ground-engaging assembly to a frame of an agricultural implement, a ground-engaging tool pivotably coupled to the attachment structure at a pivot joint, and a shear pin at least partially extending through the attachment structure and the ground-engaging tool to prevent pivoting of the ground-engaging tool about the pivot joint. The system also includes an orientation sensor configured to generate data indicative of an orientation of the attachment structure, and a computing system communicatively coupled to the orientation sensor. The computing system is configured to monitor the orientation of the attachment structure and determine a change in an
(Continued)

operational status of the shear pin based on detected changes in the monitored orientation of the attachment structure.

20 Claims, 5 Drawing Sheets

(51) Int. Cl.
  *A01B 35/24* (2006.01)
  *A01B 35/32* (2006.01)
  *G01B 7/30* (2006.01)
  *G01D 5/16* (2006.01)

(56) References Cited

U.S. PATENT DOCUMENTS

| | | | |
|---|---|---|---|
| 2,113,666 | A | 4/1938 | Suman |
| 2,124,965 | A | 7/1938 | Lind |
| 3,704,459 | A | 11/1972 | Young |
| 4,246,456 | A | 1/1981 | Leonard |
| 4,934,611 | A | 6/1990 | Lewis |
| 5,017,912 | A | 5/1991 | Willis |
| 5,142,914 | A | 9/1992 | Kusakabe et al. |
| 5,195,597 | A | 3/1993 | Yeomans |
| 5,695,012 | A * | 12/1997 | Kesting ............... A01B 61/046 172/699 |
| 5,870,689 | A | 2/1999 | Hale et al. |
| 5,923,270 | A | 7/1999 | Sampo et al. |
| 6,041,582 | A | 3/2000 | Tiede et al. |
| 6,226,597 | B1 | 5/2001 | Eastman et al. |
| 6,276,916 | B1 | 8/2001 | Schad et al. |
| 6,556,143 | B2 | 4/2003 | Noah |
| 7,009,123 | B2 | 3/2006 | Banville et al. |
| 7,324,882 | B2 | 1/2008 | Heinsey et al. |
| 7,328,625 | B2 | 2/2008 | Sundermeyer et al. |
| 7,353,723 | B2 | 4/2008 | Lardy et al. |
| 7,392,123 | B2 | 6/2008 | Heinsey et al. |
| 7,412,898 | B1 | 8/2008 | Smith et al. |
| 7,463,035 | B2 | 12/2008 | Merchant et al. |
| 7,747,396 | B2 | 6/2010 | El-Bakry et al. |
| 7,889,840 | B2 | 2/2011 | Vasudevan et al. |
| 7,973,671 | B2 | 7/2011 | Cloutier et al. |
| 8,024,980 | B2 | 9/2011 | Arms et al. |
| 8,494,810 | B2 | 7/2013 | Goldfine et al. |
| 8,596,134 | B2 | 12/2013 | Mekid et al. |
| 8,600,611 | B2 | 12/2013 | Seize |
| 8,600,627 | B2 | 12/2013 | Beck et al. |
| 8,706,447 | B2 | 4/2014 | Iannone |
| 8,768,657 | B2 | 7/2014 | Goldfine et al. |
| 8,810,370 | B2 | 8/2014 | Tillotson et al. |
| 9,119,347 | B2 | 9/2015 | Bonte et al. |
| 9,144,199 | B2 | 9/2015 | Ritter et al. |
| 9,194,376 | B2 | 11/2015 | Ritter et al. |
| 9,429,485 | B1 | 8/2016 | Cavallaro |
| 9,483,674 | B1 | 11/2016 | Fink et al. |
| 9,547,783 | B2 | 1/2017 | Lewis et al. |
| 9,566,939 | B1 | 2/2017 | Rivera et al. |
| 9,638,756 | B2 | 5/2017 | Srinivasan et al. |
| 9,645,061 | B2 | 5/2017 | Hsieh |
| 9,677,592 | B2 | 6/2017 | Bernhardt |
| 9,677,593 | B2 | 6/2017 | Hsieh |
| 9,952,129 | B2 | 4/2018 | Kondo |
| 10,025,893 | B2 | 7/2018 | Andersson et al. |
| 10,066,930 | B2 | 9/2018 | Klasén |
| 10,294,636 | B2 | 5/2019 | Leslie et al. |
| 10,316,881 | B2 | 6/2019 | Brown |
| 2001/0048369 | A1 | 12/2001 | Noah |
| 2006/0003846 | A1 | 1/2006 | Burger et al. |
| 2008/0046130 | A1 | 2/2008 | Faivre et al. |
| 2013/0180742 | A1 | 7/2013 | Wendte et al. |
| 2016/0055280 | A1 | 2/2016 | Devoy et al. |
| 2017/0196160 | A1 | 7/2017 | Bjerketvedt et al. |
| 2017/0321552 | A1 | 11/2017 | Gustafsson |
| 2018/0073542 | A1 | 3/2018 | Saigo et al. |
| 2018/0155132 | A1 | 6/2018 | Li et al. |
| 2018/0238768 | A1 | 8/2018 | Lajnef et al. |
| 2019/0107138 | A1 | 4/2019 | Brown |
| 2020/0337202 | A1 | 10/2020 | Hertzog et al. |
| 2020/0390023 | A1 | 12/2020 | Harmon et al. |
| 2021/0059098 | A1 | 3/2021 | Kovach |
| 2021/0102856 | A1 | 4/2021 | Glovier et al. |
| 2021/0102984 | A1 | 4/2021 | Stanhope et al. |
| 2021/0132573 | A1 | 5/2021 | Sporrer et al. |
| 2021/0134090 | A1 * | 5/2021 | Sporrer et al. ........... B60Q 9/00 |

FOREIGN PATENT DOCUMENTS

| | | |
|---|---|---|
| CN | 204166662 U | 2/2015 |
| CN | 204256887 U | 4/2015 |
| CN | 104614775 A | 5/2015 |
| EP | 1557588 | 7/2005 |
| EP | 2201833 A1 | 6/2010 |
| GB | 1271308 A | 4/1972 |
| GB | 2264619 A | 9/1993 |
| JP | S 57191472 A | 11/1982 |
| JP | H 04204394 A | 7/1992 |
| JP | 2014109457 A | 6/2014 |
| JP | 6259203 B2 | 1/2018 |
| WO | WO 2009116966 | 9/2009 |
| WO | WO 2018030942 | 2/2018 |
| WO | WO 2018/073791 | 4/2018 |
| WO | WO 2018/223231 | 12/2018 |

OTHER PUBLICATIONS

"Why Settle for Only One or Two Axes?", Design News 63.14, Cahners Publishing Co, dated Oct. 6, 2008 (2 pages) http://dialog.proquest.com/professional/docview/743564886?accountid=157282.

"Bringing Internet of Things to Bolted Connections"—StrainLabs, dated Oct. 17, 2018 (4 pages) https://strain-labs.com/bringing-internet-of-things-to-bolted-connections/.

"Real Time Shank Bolt Detection", Shank Patrol, dated Oct. 22, 2018 (3 pages) https://shankpatrol.com/.

Mechanica Systems, "Shear Pin Load Sensor", dated Jul. 28, 2019. (2 pages) http://www.mechanicas.net/shear-pin-load-sensor.html.

* cited by examiner

SYSTEM AND METHOD FOR MONITORING AN OPERATIONAL STATUS OF A SHEAR PIN FOR A GROUND-ENGAGING ASSEMBLY OF AN AGRICULTURAL IMPLEMENT

FIELD

The present disclosure relates generally to agricultural implements and, more particularly, to systems and methods for monitoring the operational status of a shear pin or bolt for a ground-engaging assembly of an agricultural implement, such as the shear pin for a shank assembly of an agricultural implement.

BACKGROUND

It is well known that, to attain the best agricultural performance from a field, a farmer must cultivate the soil, typically through a tillage operation. Modern farmers perform tillage operations by pulling a tillage implement behind an agricultural work vehicle, such as a tractor. Tillage implements typically include a plurality of ground-engaging tools configured to penetrate the soil to a particular depth. In this respect, the ground-engaging tools may be pivotally coupled to a frame of the tillage implement. In many instances, biasing elements, such as springs, are used to exert biasing forces on the ground-engaging tools. This configuration may allow the ground-engaging tools to be biased towards a desired position relative to the frame, thereby maintaining the particular depth of soil penetration as the agricultural work vehicle pulls the tillage implement through the field. Additionally, this configuration may also permit the ground-engaging tools to pivot out of the way of rocks or other impediments in the soil, thereby preventing damage to the ground-engaging tools or other components on the implement.

In addition to such biasing elements, tillage implements often utilize a shear-bolt mounting arrangement in which shear pins or bolts are used to couple the ground-engaging tools to the frame or associated attachment structure. In such an embodiment, the shear pins serve to protect the ground-engaging tools from excessive loading that would otherwise substantially damage or break the tools. For instance, such a configuration may allow a ground-engaging tool to pivot out of the way of rocks or other impediments in the soil when the adjustability provided by the associated biasing element is insufficient.

When a shear pin breaks during the performance of an agricultural operation, the associated ground-engaging tool typically will no longer be capable of effectively working the soil. However, with current implement configurations, it is often very difficult for the operator to determine when one or more of the shear pins have failed. As such, an extensive portion of the field may have been worked before discovering the broken shear pin(s).

Accordingly, systems and methods for monitoring the operational status of a shear pin for a ground-engaging assembly of an agricultural implement would be welcomed in the technology.

BRIEF DESCRIPTION

Aspects and advantages of the technology will be set forth in part in the following description, or may be obvious from the description, or may be learned through practice of the technology.

In one aspect, the present subject matter is directed to a system for monitoring the operational status of shear pins for ground-engaging assemblies of agricultural implements. The system includes a ground-engaging assembly including an attachment structure pivotably coupling the ground-engaging assembly to a frame of an agricultural implement, a ground-engaging tool pivotably coupled to the attachment structure at a pivot joint, and a shear pin at least partially extending through the attachment structure and the ground-engaging tool to prevent pivoting of the ground-engaging tool about the pivot joint. The system also includes an orientation sensor configured to generate data indicative of an orientation of the attachment structure, and a computing system communicatively coupled to the orientation sensor. The computing system is configured to monitor the orientation of the attachment structure and determine a change in an operational status of the shear pin based on detected changes in the monitored orientation of the attachment structure.

In another aspect, the present subject matter is directed to an agricultural implement including a frame and a plurality of shank assemblies supported relative to the frame. Each shank assembly includes an attachment structure pivotably coupling the shank assembly to the frame, a shank pivotably coupled to the attachment structure at a pivot joint, a shear pin at least partially extending through the attachment structure and the shank to prevent pivoting of the shank about the pivot joint, and a biasing element coupled between the frame and the attachment structure, the biasing element being configured to bias the shank towards a ground-engaging position. The implement also includes a plurality of orientation sensors, with each orientation sensor being configured to generate data indicative of an orientation of the attachment structure of a respective shank assembly of the plurality of shank assemblies. Additionally, the implement includes a computing system communicatively coupled to the plurality of orientation sensors. The computing system is configured to monitor the orientation of the attachment structure of each of the plurality of shank assemblies and determine a change in an operational status of the shear pin of a given shank assembly of the plurality of shank assemblies based on detected changes in the monitored orientation of the attachment structure of the given shank assembly.

In a further aspect, the present subject matter is directed to a method for monitoring the operational status of a shear pin for a ground-engaging assembly of an agricultural implement. The ground-engaging assembly includes an attachment structure pivotably coupling the ground-engaging assembly to a frame of the agricultural implement, a ground-engaging tool pivotably coupled to the attachment structure at a pivot joint, and a shear pin at least partially extending through the attachment structure and the ground-engaging tool to prevent pivoting of the ground-engaging tool about the pivot joint. The method includes monitoring, with a computing system, an orientation of the attachment structure of the shank assembly, determining, with the computing system, that a change in an operational status of the shear pin of the shank assembly has occurred based on detected changes in the monitored orientation of the attachment structure, and automatically initiating, with the computing system, a control action in response to determining that the change in the operational status of the shear pin of the shank assembly has occurred.

These and other features, aspects and advantages of the present technology will become better understood with reference to the following description and appended claims.

The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
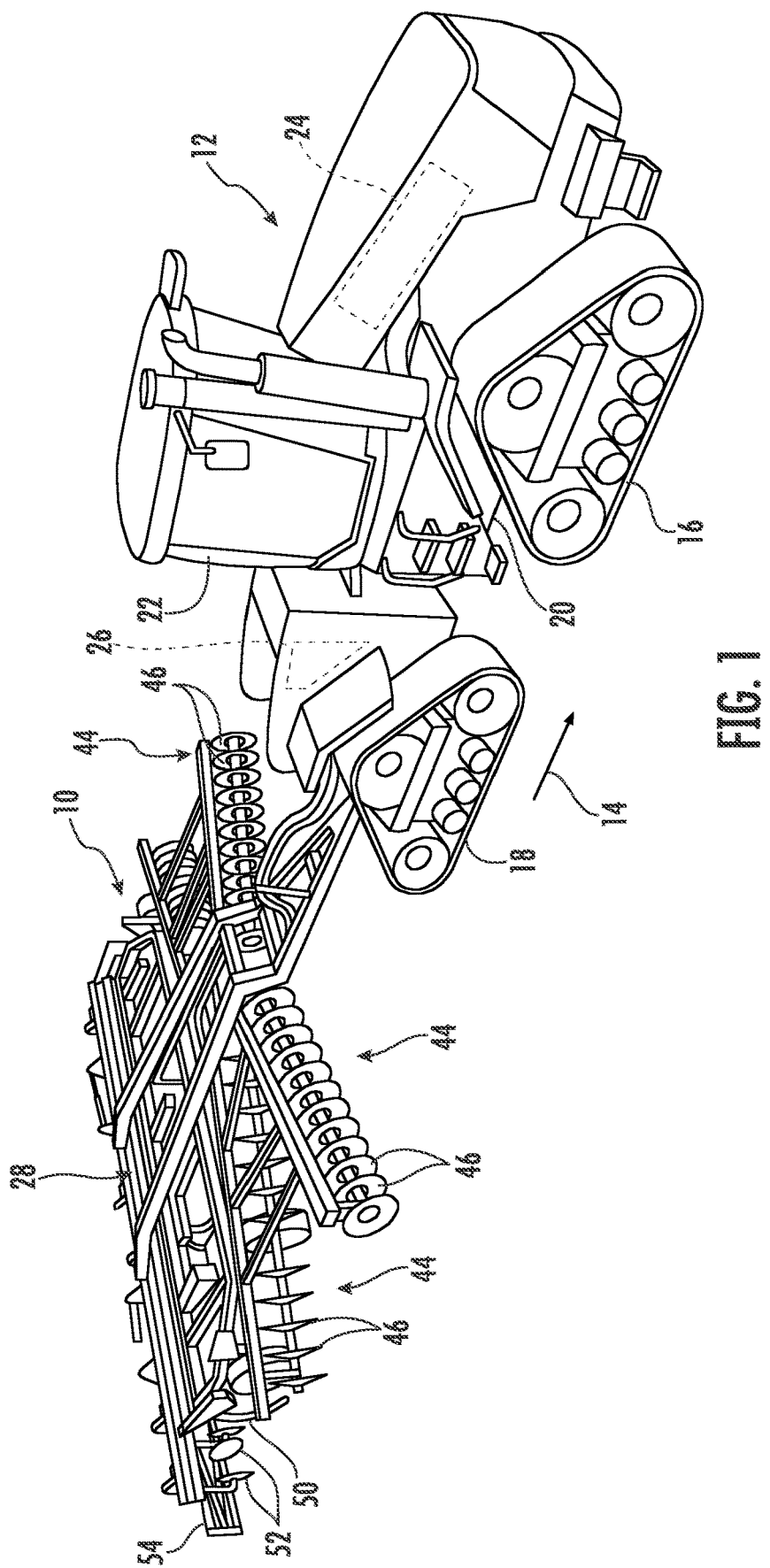
FIG. 1 illustrates a perspective view of one embodiment of an agricultural implement coupled to a work vehicle in accordance with aspects of the present subject matter.

Repeat use of reference characters in the present specification and drawings is intended to represent the same or analogous features or elements of the present technology.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for monitoring the operational status of shear pins for ground-engaging assemblies of an agricultural implement. Specifically, in several embodiments, the disclosed system may be utilized to monitor the operational status of shear pins used in association with shank assemblies. For instance, a shank may often be pivotably coupled to a frame of an agricultural implement via an associated attachment structure, with the shank being coupled to the attachment structure via a shear bolt or pin that prevents pivoting of the shank relative to the attachment structure during normal loading conditions. In addition, a biasing element is provided to bias the attachment structure downwardly into a ground engaging orientation or position relative to the implement frame such that the shank is properly engaged with the ground during the performance of an agricultural operation. During normal loading conditions, the attachment structure is configured to pivot upwardly relative to the frame (against the bias of the biasing element) to clear rocks or obstacles within the field. However, during an extreme loading event in which a significant amount of force is transmitted through the shank assembly, the shear pin is designed to fracture or fail, thereby allowing the shank to rotate relative to the attachment structure to clear the obstacle. Such events are typically characterized by the attachment structure pivoting upwardly at a very fast rate to a position or orientation outside the normal operating range for such structure immediately prior to failure of the shear pin.

Accordingly, the present inventor has determined that shear pin failures may be inferred by continuously monitoring the orientation of the attachment structure to detect unexpected changes or variations in the monitored orientation. For instance, in one embodiment, the monitored orientation of the attachment structure may be compared to a predetermined orientation range generally corresponding to the expected or normal orientation range for the attachment structure during normal loading conditions. When it is determined that the monitored orientation of the attachment structure has fallen outside of the range (e.g., when the attachment structure pivots upwardly beyond a maximum threshold associated with such range), it may be determined or inferred that the operational status of the shear pin associated with such shank assembly has changed (e.g., due to partial or complete failure of the shear pin). In another embodiment, the rate of change of the monitored orientation of the attachment structure may be compared to a predetermined rate-of-change threshold. When it is determined that the rate-of-change of the monitored orientation of the attachment structure exceeds the rate-of-change threshold (e.g., when the attachment structure pivots upwardly at a very fast rate), it may be determined or inferred that the operational status of the shear pin associated with such shank assembly has changed (e.g., due to partial or complete failure of the shear pin). Upon inferring or determining that the operational status of the shear pin has changed, a suitable control action may be executed, such as notifying the operator or automatically adjusting the operation of the implement or the associated tow vehicle.

Figure 2:
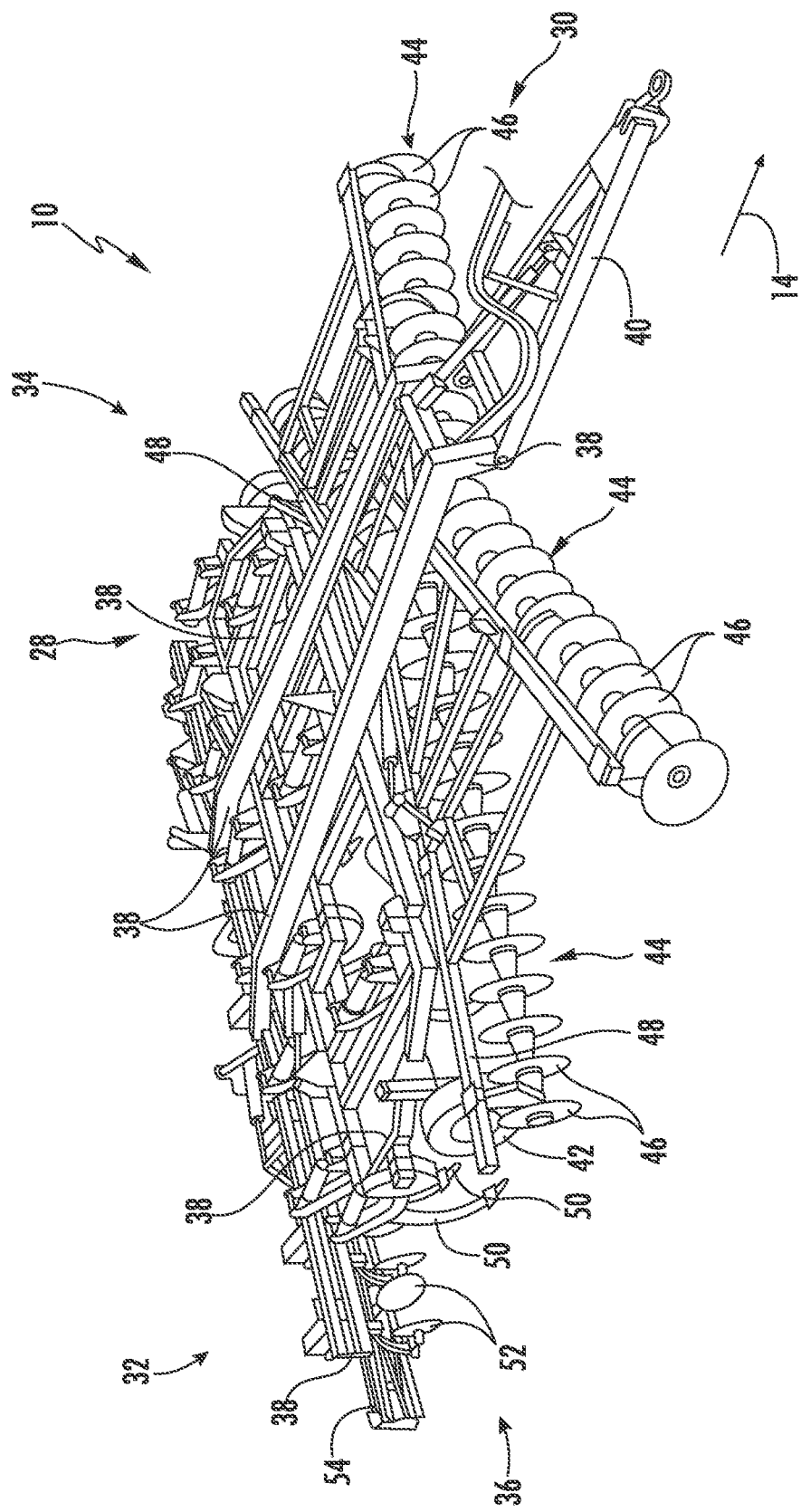
FIG. 2 illustrates another perspective view of the agricultural implement shown in FIG. 1 in accordance with aspects of the present subject matter, particularly illustrating various components of the implement.

Referring now to the drawings, FIGS. 1 and 2 illustrate differing perspective views of one embodiment of an agricultural implement 10 in accordance with aspects of the present subject matter. Specifically, FIG. 1 illustrates a perspective view of the agricultural implement 10 coupled to a work vehicle 12. Additionally, FIG. 2 illustrates a perspective view of the implement 10, particularly illustrating various components of the implement 10.

In general, the implement 10 may be configured to be towed across a field in a direction of travel (e.g., as indicated by arrow 14 in FIG. 1) by the work vehicle 12. As shown, the implement 10 may be configured as a tillage implement, and the work vehicle 12 may be configured as an agricultural tractor. However, in other embodiments, the implement 10 may be configured as any other suitable type of implement, such as a seed-planting implement, a fertilizer-dispensing implement, and/or the like. Similarly, the work vehicle 12 may be configured as any other suitable type of vehicle, such as an agricultural harvester, a self-propelled sprayer, and/or the like.

As shown in FIG. 1, the work vehicle 12 may include a pair of front track assemblies 16, a pair or rear track assemblies 18, and a frame or chassis 20 coupled to and supported by the track assemblies 16, 18. Alternatively, the track assemblies 16, 18 can be replaced with tires or other suitable traction members. An operator's cab 22 may be supported by a portion of the chassis 20 and may house various input devices for permitting an operator to control the operation of one or more components of the work vehicle 12 and/or one or more components of the implement 10. Additionally, as is generally understood, the work vehicle 12 may include an engine 24 and a transmission 26 mounted on the chassis 20. The transmission 26 may be operably coupled to the engine 24 and may provide variably adjusted gear ratios for transferring engine power to the track assemblies 16, 18 via a drive axle assembly (not shown) (or via axles if multiple drive axles are employed).

As shown particularly in FIG. 2, the implement 10 may include a frame 28. The frame 28 may extend longitudinally between a forward end 30 and an aft end 32. The frame 28 may also extend laterally between a first side 34 and a second side 36. As shown in FIG. 2, the frame 28 generally includes a plurality of structural frame members 38, such as beams, bars, and/or the like, configured to support or couple to a plurality of components. Furthermore, a hitch assembly 40 may be connected to the frame 28 and configured to couple the implement 10 to the work vehicle 12. Additionally, a plurality of wheels 42 (one of which is shown in FIG. 2) may be coupled to the frame 28 to facilitate towing the implement 10 in the direction of travel 14.

In several embodiments, one or more ground-engaging tools may be coupled to and/or supported by the frame 28. More particularly, in certain embodiments, the ground-engaging tools may include one or more shanks 50 and/or disc blades 46 supported relative to the frame 28. In one embodiment, each shank 50 and/or disc blade 46 may be individually supported relative to the frame 28. Alternatively, one or more groups or sections of the ground-engaging tools may be ganged together to form one or more ganged tool assemblies, such as the disc gang assemblies 44 shown in FIGS. 1 and 2.

As illustrated in FIG. 2, each disc gang assembly 44 includes a toolbar 48 coupled to the implement frame 28 and a plurality of disc blades 46 supported by the toolbar 48 relative to the implement frame 28. Each disc blade 46 may, in turn, be configured to penetrate into or otherwise engage the soil as the implement 10 is being pulled through the field. As is generally understood, the various disc gang assemblies 44 may be oriented at an angle relative to the direction of travel 14 to promote more effective tilling of the soil.

It should be appreciated that, in addition to the shanks 50 and the disc blades 46, the implement frame 28 may be configured to support any other suitable ground-engaging tools. For instance, in the illustrated embodiment, the frame 28 is also configured to support a plurality of leveling blades 52 and rolling (or crumbler) basket assemblies 54. In other embodiments, any other suitable ground-engaging tools may be coupled to and supported by the implement frame 28.

It should be appreciated that the configuration of the implement 10 described above and shown in FIGS. 1 and 2 is provided only to place the present subject matter in an exemplary field of use. Thus, it should be appreciated that the present subject matter may be readily adaptable to any manner of implement configuration.

Figure 3:
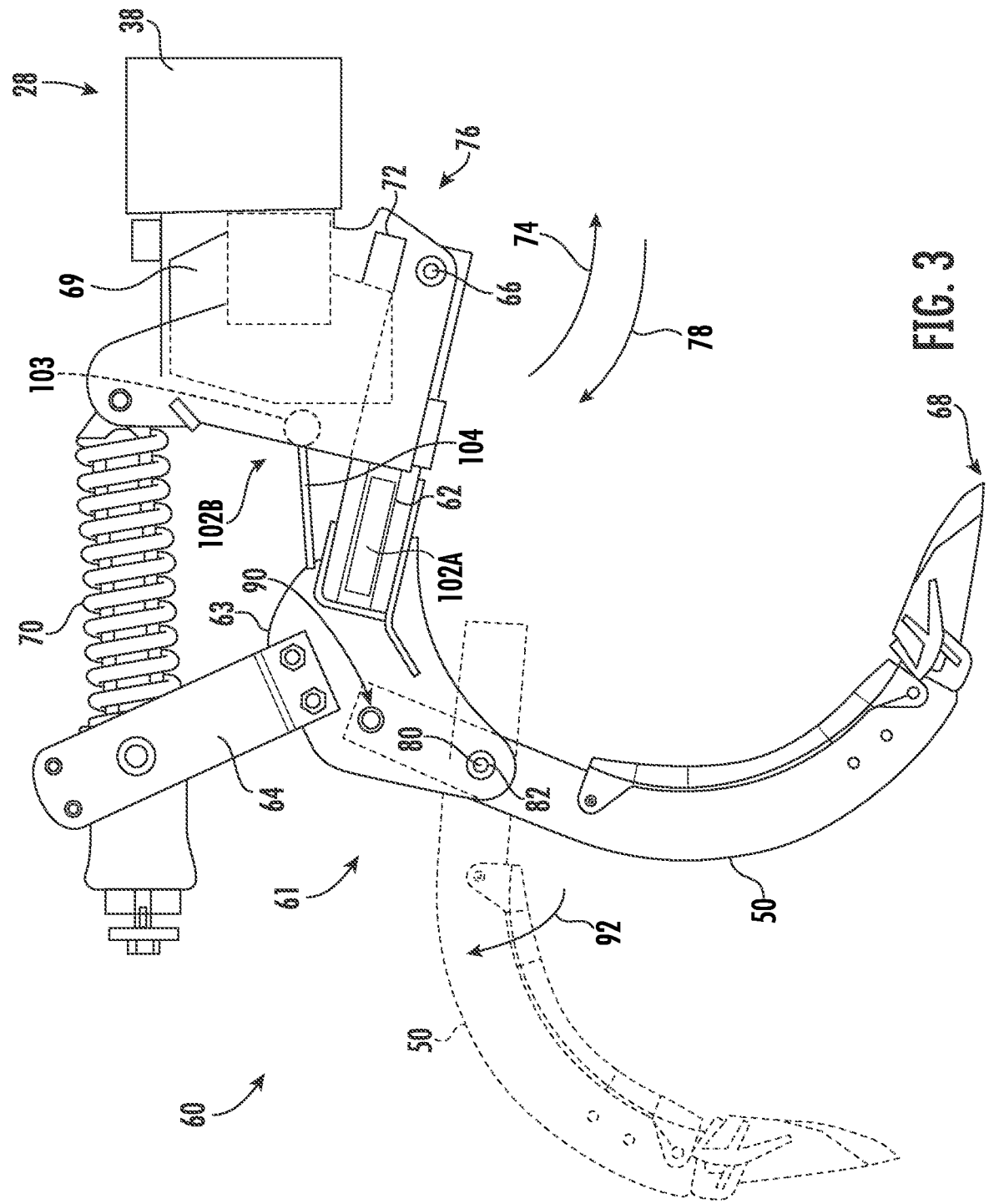
FIG. 3 illustrates a side view of one embodiment of a shank assembly including a shank pivotally coupled to an implement frame in accordance with aspects of the present subject matter, particularly illustrating a shear pin extending through the shank and associated components of one embodiment of a system for monitoring the operational status of the shear pin in accordance with aspects of the present subject matter.

Referring now to FIG. 3, a side-view of one embodiment of a shank assembly 60 including one of the shanks 50 of the tillage implement 10 described above with reference to FIGS. 1 and 2 is illustrated in accordance with aspects of the present subject matter. As shown in the illustrated embodiment, the shank assembly 60 includes a shank 50 having a tip end 68 that is configured to penetrate into or otherwise engage the ground as the implement 10 is being pulled through the field. In one embodiment, the shank 50 may be configured as a chisel. However, one of ordinary skill in the art would appreciate that the ground-engaging tool may be configured as a sweep, tine, or any other suitable ground-engaging tool. It should also be appreciated an auxiliary attachment may also be coupled to the shank 50 at its tip end 68, such as a point attachment.

Additionally, the shank assembly 60 also includes attachment structure 61 (e.g., first, second, and third attachment members 62, 63, 64) for pivotally coupling the shank 50 to the implement frame 28 (e.g., at a first pivot point 66). For instance, as shown in FIG. 3, a first attachment member 62 is pivotably coupled to a shank base frame 69, which, in turn, is rigidly or fixedly coupled to the implement frame 28 (e.g., a frame member 38 of the frame 28). A second attachment member 63 is rigidly coupled to the first attachment member 62 for supporting the shank 50 relative to the frame 28 and a third attachment member 64 is rigidly coupled to the second attachment member 63 for coupling the shank 50 to a biasing element 70 of the shank assembly 60.

As shown in FIG. 3, in several embodiments, the biasing element 70 may be coupled between the frame 28 (e.g., via the shank base frame 69) and the attachment structure 61 for the shank assembly 60 (e.g., third attachment member 64) to bias the attachment structure 61 (and, thus, the shank 50 coupled thereto) to a predetermined ground-engaging tool position (e.g., a home or base position) relative to the frame 28. In general, the predetermined ground-engaging tool position may correspond to a ground-engaging tool position in which the shank 50 penetrates the soil to a desired depth. In several embodiments, the predetermined ground-engaging tool position may be set by a mechanical stop 72. In operation, the biasing element 70 may permit relative movement between the attachment structure 61 and the frame 28. For example, the biasing element 70 may be configured to bias the attachment structure 61 to pivot relative to the frame 28 in a first pivot direction (e.g., as indicated by arrow 74 in FIG. 3) until an end 76 of the first attachment member 62 of the shank assembly 60 contacts the stop 72. The biasing element 70 may also allow the attachment structure to pivot away from the predetermined ground-engaging tool position (e.g., to a shallower depth of penetration), such as in a second pivot direction (e.g., as indicated by arrow 78 in FIG. 3) opposite the first pivot direction 74, when the shank 50 encounters rocks or other impediments in the field. As shown in FIG. 3, the biasing element 70 corresponds to a spring. It should be recognized, however, the biasing element 70 may be configured as an actuator or any other suitable biasing element.

As further illustrated in FIG. 3, the shank 50 may further be pivotably coupled to the attachment structure 61 of the shank assembly 60 at a second pivot point 80 to allow pivoting of the shank 50 relative to the attachment structure 61 about such pivot point 80 independent of the pivotal motion of the attachment structure 61 about the first pivot point 66. More particularly, as shown in the illustrated embodiment, the shank 50 is pivotally coupled to the second attachment member 63 of the attachment structure 61 at the second pivot point 80, which, in turn, is coupled to the frame 28 at the first pivot point 66 via the first attachment member 62. In such an embodiment, the shank 50 may be coupled to the second attachment member 63 via an associated pivot member 82 (e.g., a pivot bolt or pin) extending through both the shank 50 and the attachment member 63 at the second pivot point 80.

Additionally, as shown in FIG. 3, the shank assembly 60 may further include a shear bolt or pin 90 (simply referred to hereinafter as a "shear pin" for simplicity purposes and without intent to limit) at least partially extending through both the second attachment member 63 and the shank 50 at a location separate from the pivot point 80 defined between such components. For instance, in the illustrated embodiment, the shear pin 90 is positioned above the pivot point 80 defined between the shank 50 and the adjacent attachment member 63. In general, the shear pin 90 may be configured to prevent rotation of the shank 50 relative to the attachment member 63 when the shear pin 90 is in an operable working condition or state, for instance when the shear pin 90 has not sheared or otherwise failed. In one embodiment, the shear pin 90 may correspond to a mechanical pin designed such that the pin breaks when a predetermined force is applied through the pin. For instance, the shear pin 90 may be designed to withstand normal or expected loading conditions for the shank 50 and fail when the loads applied through the pin 90 exceed or substantially exceed such normal/expected loading conditions.

During normal operation, the tip end 68 of the shank 50 may encounter impediments in the field causing the shank assembly 60 to rotate about the first pivot point 66 in the second pivot direction 78. Typically, the shank assembly 60 will pivot upwards in the second pivot direction 78 about the first pivot point 66 to clear the impediment and then will return to its home or ground-engaging position via the action of the biasing element 70. However, in certain instances, the shank assembly 60 may rotate upwardly without clearing the impediment, in which case a significant amount of force may be transmitted through the shank assembly 60. In such instances the shear pin 90 may be designed to fracture or fail, thereby allowing the shank 50 to rotate about the second pivot point 80 relative to the attachment structure 61. For instance, the shank 50 may rotate about the second pivot point 80 (as indicated by arrow 92 in FIG. 3) to the shank position indicated by dashed lines in FIG. 3.

In accordance with aspects of the present subject matter, one or more orientation sensors 102 may be provided in operative association with the attachment structure 61 of the shank assembly 60. The orientation sensor(s) 102 may generally be configured to generate data associated with an orientation of the attachment structure relative to a reference orientation/position (e.g., relative to the frame, the ground, the direction of gravity, etc.). As will be described below, an associated computing system may be configured to continuously monitor the orientation of the attachment structure 61 based on the data received from the sensor(s) 102 to determine or infer when the operational status of the shear pin 90 of the shank assembly 60 has changed (e.g., due to a partial or complete failure of the shear pin). For instance, the computing system may be configured to compare the monitored orientation of the attachment structure 61 to a predetermined operational range or threshold to determine or infer failure of the shear pin 90.

In one embodiment, the orientation sensor(s) may correspond to one or more global orientation sensor(s), such as one or more inclinometers, gyroscopes, accelerometers, inertial measurement units (IMUs) and/or the like, configured to monitor the orientation of the attachment structure 61 relative to the direction of gravity. In such an embodiment, the global orientation sensor(s) may be configured to be mounted (directly or indirectly) to a portion of the attachment structure 61. For instance, as shown in FIG. 3, a global orientation sensor 102A is mounted to the first attachment member 62. However, in other embodiments, the global orientation sensor may be configured to be mounted to any other suitable portion of the attachment structure 61, such as the second attachment member 63 and/or the third attachment member 64. Additionally, in one embodiment, the global orientation sensor may be configured to be mounted to a portion of the shank 50.

In another embodiment, the orientation sensor(s) may correspond to one or more local orientation sensor(s), such as one or more position sensors, potentiometers, proximity sensors, and/or the like, configured to monitor the orientation of the attachment structure 61 relative to another component of the implement 10. In several embodiments, one or more local orientation sensors may be provided in operative association with the shank assembly 60 for monitoring the orientation of the attachment structure 61 relative to the implement frame 28. For instance, as shown in FIG. 3, a location orientation sensor 102B (e.g., in the form of a rotary potentiometer 103 and associated linkage 104) is coupled between the attachment structure 61 (e.g., the second attachment member 63) and the frame 28 (e.g., via the base shank frame 69) to monitor the orientation of the attachment structure 61 relative to the frame 28.

Of course, it should be appreciated that, in other embodiments, any other suitable orientation sensor(s) may be used that is configured to generate data associated with the orientation of the attachment structure 61 relative to a given reference orientation/position. It should also be appreciated that, although FIG. 3 simply illustrates a single shank assembly 60, each and every shank assembly 60 (or a select number of such shank assemblies 60) of a given agricultural implement may be configured the same as or similar to the shank assembly 60 described above, such as by including one or more orientation sensors 102 associated therewith to allow the operational status of each associated shear pin 90 to be monitored via the data provided by the sensors 102.

Figure 4:
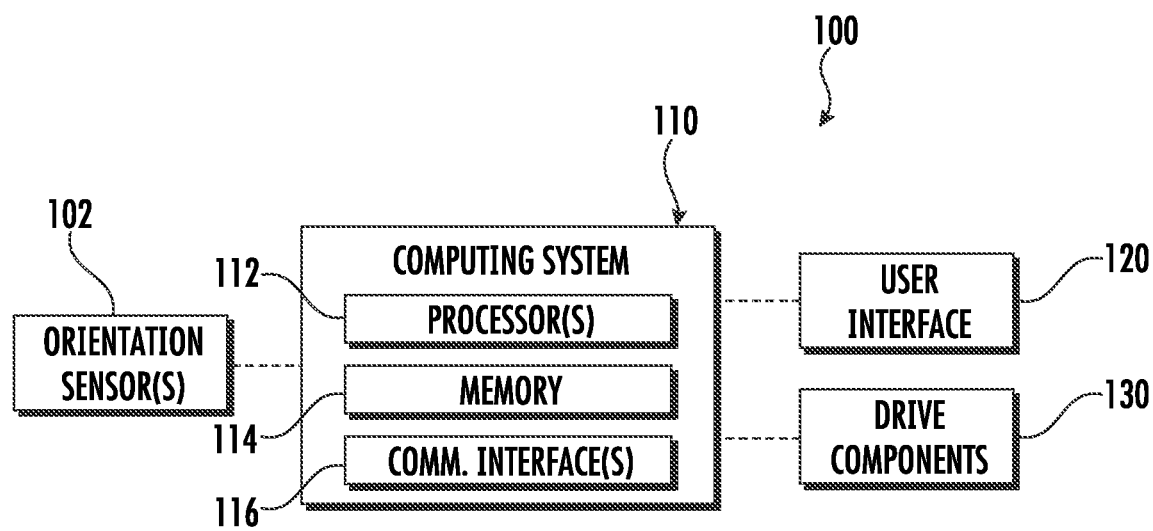
FIG. 4 illustrates a schematic view of one embodiment of a system for monitoring the operational status of a shear pin for a ground-engaging assembly of an agricultural implement in accordance with aspects of the present subject matter.

Referring now to FIG. 4, a schematic view of one embodiment of a system 100 for monitoring the operational status of a shear pin for a ground-engaging assembly of an agricultural implement is illustrated in accordance with aspects of the present subject matter. In general, the system 100 will be described herein with reference to the implement 10 described above with reference to FIGS. 1 and 2 and the shank assembly 60 described above with reference to FIG. 3. However, it should be appreciated that, in general, the disclosed system 100 may be utilized with any suitable implement having any suitable implement configuration to allow the operational status of a shear pin for a ground-engaging assembly of the implement to be monitored. Moreover, it should be appreciated that the disclosed system 100 may be used with any other suitable ground-engaging assembly of an agricultural implement that utilizes a shear pin to prevent pivoting of such assembly during normal operating conditions.

As shown in FIG. 4, the system 100 may include a computing system 110 and various other components configured to be communicatively coupled to and/or controlled by the computing system 110. For instance, the computing system 110 may be communicatively coupled to one or more orientation sensor(s) (e.g., the orientation sensors 102 described above with reference to FIG. 3) configured to generate data indicative of the orientation of the attachment structure of a shank assembly (e.g., the attachment structure 61 of shank assembly 60 described above). Additionally, in one embodiment, the computing system 110 may be communicatively coupled to and/or configured to control a user interface 120 and/or one or more drive components 130 of a work vehicle configured to tow the associated implement (e.g., the engine and/or the transmission of the work vehicle 12 described above)

In general, the computing system 110 may comprise any suitable processor-based device known in the art, such as a computing device or any suitable combination of computing devices. Thus, in several embodiments, the computing system 110 may include one or more processor(s) 112, and associated memory device(s) 114 configured to perform a variety of computer-implemented functions. As used herein, the term "processor" refers not only to integrated circuits referred to in the art as being included in a computer, but also refers to a controller, a microcontroller, a microcomputer, a programmable logic circuit (PLC), an application specific integrated circuit, and other programmable circuits. Additionally, the memory device(s) 114 of the computing system 110 may generally comprise memory element(s) including, but not limited to, a computer readable medium (e.g., random access memory RAM)), a computer readable non-volatile medium (e.g., a flash memory), a floppy disk, a compact disk-read only memory (CD-ROM), a magneto-optical disk (MOD), a digital versatile disk (DVD) and/or other suitable memory elements. Such memory device(s) 114 may generally be configured to store suitable computer-readable instructions that, when implemented by the processor(s) 112, configure the computing system 110 to perform various computer-implemented functions, such as one or more aspects of the methods and algorithms that will be described herein. In addition, the computing system 110 may also include various other suitable components, such as a communications circuit or module, one or more input/output channels, a data/control bus and/or the like.

It should be appreciated that, in several embodiments, the computing system 110 may correspond to an existing computing system of the agricultural implement 10 and/or of the work vehicle 12 to which the implement 10 is coupled. However, it should be appreciated that, in other embodiments, the computing system 110 may instead correspond to a separate processing device. For instance, in one embodiment, the computing system 110 may form all or part of a separate plug-in module that may be installed within the agricultural implement 10 to allow for the disclosed system and method to be implemented without requiring additional software to be uploaded onto existing control devices of the agricultural implement 10.

In some embodiments, the computing system 110 may include one or more communications modules or interfaces 116 for allowing the computing system 110 to communicate with any of the various other system components described herein. For instance, one or more communicative links or interfaces (e.g., one or more data buses) may be provided between the communications interface 116 and the orientation sensor(s) 102 to allow the computing system 110 to receive data indicative of the orientation of the attachment structure 61 of an associated shank assembly 60. Further, one or more communicative links or interfaces (e.g., one or more data buses) may be provided between the communications interface 116 and the user interface 120 to allow operator inputs to be received by the computing system 110 and/or to allow the computing system 110 to control the operation of one or more components of the user interface 120. Additionally, one or more communicative links or interfaces (e.g., one or more data buses) may be provided between the communications interface 116 and the vehicle drive components 130 to allow the computing system 110 to control the operation of such components 130.

In several embodiments, the computing system 110 may be configured to determine when the operational status of a shear pin (e.g., shear pin 90 described above) has changed based at least in part on the data provided via the orientation sensor(s) 102. Specifically, the computing system 110 may be configured to continuously monitor the orientation of the attachment structure 61 of the associated shank assembly 60 based on the data received from the sensor(s) 102 and compare such monitored orientation to a predetermined operational range or threshold set for the attachment structure 61. Based on such comparison, the computing system 110 may be configured to determine or infer that the operational status of the associated shear pin 90 has changed (e.g., due to a partial or complete failure of the shear pin 90).

For instance, in one embodiment, the computing system 110 may be configured to monitor the orientation of the attachment structure 61 relative to a predetermined orientation range set for the attachment structure 61. For instance, the predetermined orientation range may correspond to (or may be selected based upon) the expected or normal orientation range for the attachment structure 61 during normal loading conditions of the shank assembly 60, such as an orientation range that accommodates the normal or expected pivot range for the attachment structure 61 when the shank 50 is riding over rocks or other obstacles within the field. In such an embodiment, the maximum or minimum orientation threshold for the predetermined orientation range (depending on the frame of reference for the monitored orientation) may be selected such that, when the orientation of the attachment structure 61 exceeds or falls below such threshold, it may be inferred that an excessive or extreme loading event has occurred that likely resulted in partial or complete failure of the shear pin 90. Thus, when it is determined that the monitored orientation of the attachment structure has fallen outside of the predetermined range, the computing system 110 may be configured to determine or infer that the operational status of the associated shear pin 90 has changed.

In another embodiment, the computing system 110 may be configured to monitor the orientation of the attachment structure 61 relative to a predetermined rate-of-change threshold set for the attachment structure 61. For instance, during the occurrence of an excessive or extreme loading event, the orientation of the attachment structure 61 will change very rapidly, typically significantly faster than changes in the orientation of the attachment structure 61 during normal loading events. Thus, a predetermined rate-of-change threshold may be selected that corresponds to (or is selected based upon) a rate-of-change value that exceeds the expected or normal rate-of-change of the orientation for the attachment structure 61 during normal loading conditions. In such an embodiment, when it is determined that the rate-of-change of the monitored orientation of the attachment structure across a given time period exceeds the associated rate-of-change threshold, the computing system 110 may be configured to determine or infer that the operational status of the associated shear pin 90 has changed (e.g., due to partial or complete failure of the shear pin).

As indicated above, the system 100 may also include a user interface 120 communicatively coupled to the computing system 110. In one embodiment, the user interface 120 may be configured to provide feedback (e.g., notifications associated with status of the tools being monitored (e.g., one or more of the shear pings 90 of the shank assemblies 60) to the operator of the implement 10. For instance, the computing system 110 may be configured to alert the operator of a change in the operational status of one or more of the shear pins 90, such as when it is determined that a given shear pin 90 has failed based on the monitored orientation of the associated attachment structure 61, thereby allowing the operator to make a determination as to whether it is necessary to stop the operation of the implement 10 to check the status of the associated shear pin(s) 90.

It should be appreciated that the user interface 120 may include or be associated with one or more feedback devices (not shown), such as display screens, speakers, warning lights, and/or the like, which are configured to communicate such feedback. In one embodiment, the computing system 110 may be configured to generate an interface element for display to an operator on the user interface 120. In such an embodiment, the interface element may, for example, be associated with a visual indicator indicative of the operational status of the tools being monitored (e.g., by indicating a change in the operational status of the shear pin 90 associated with one of the shank assemblies 60). It should be appreciated that, in one embodiment, the computing system 110 may be configured to generate a separate interface element for each shear pin 90 associated with the various shank assemblies 60 of the implement 10 or may generate a single interface element representing the operational status of multiple shear pins 90. In addition, some embodiments of the user interface 120 may include one or more input devices (not shown), such as touchscreens, keypads, touchpads, knobs, buttons, sliders, switches, mice, microphones, and/or the like, which are configured to receive user inputs from the operator. In one embodiment, the user interface 120 may be positioned within the operator's cab 22 of the work vehicle 12. However, in alternative embodiments, the user interface 120 may have any suitable configuration and/or be positioned in any other suitable location.

In addition to such operator notifications (or as an alternative thereto), the computing system 110 may be configured to implement any other suitable control action in response to determining that a change in the operational status of one or more shear pins 90 has occurred. For example, the computing system 110 may control the operation of one or more drive components 130 configured to drive the work vehicle 12 coupled to the implement 10, such as the engine and/or transmission of the vehicle 12. In such embodiments, the computing system 110 may be configured to control the operation of the drive component(s) 130 to reduce the operating or ground speed of vehicle/implement, including bring the vehicle/implement to a complete stop. By bringing the vehicle/implement to a stop, the system 100 may prevent cultivation of portions of the field while one or more shank assemblies 60 are not engaging the soil due to, for example, a sheared or broken shear pin(s) 90. It should be appreciated that, depending on the type of control system being used, the above-described control actions may be executed directly by the computing system 110 or indirectly via communications with a separate computing system (e.g., using an ISObus communications protocol).

Figure 5:
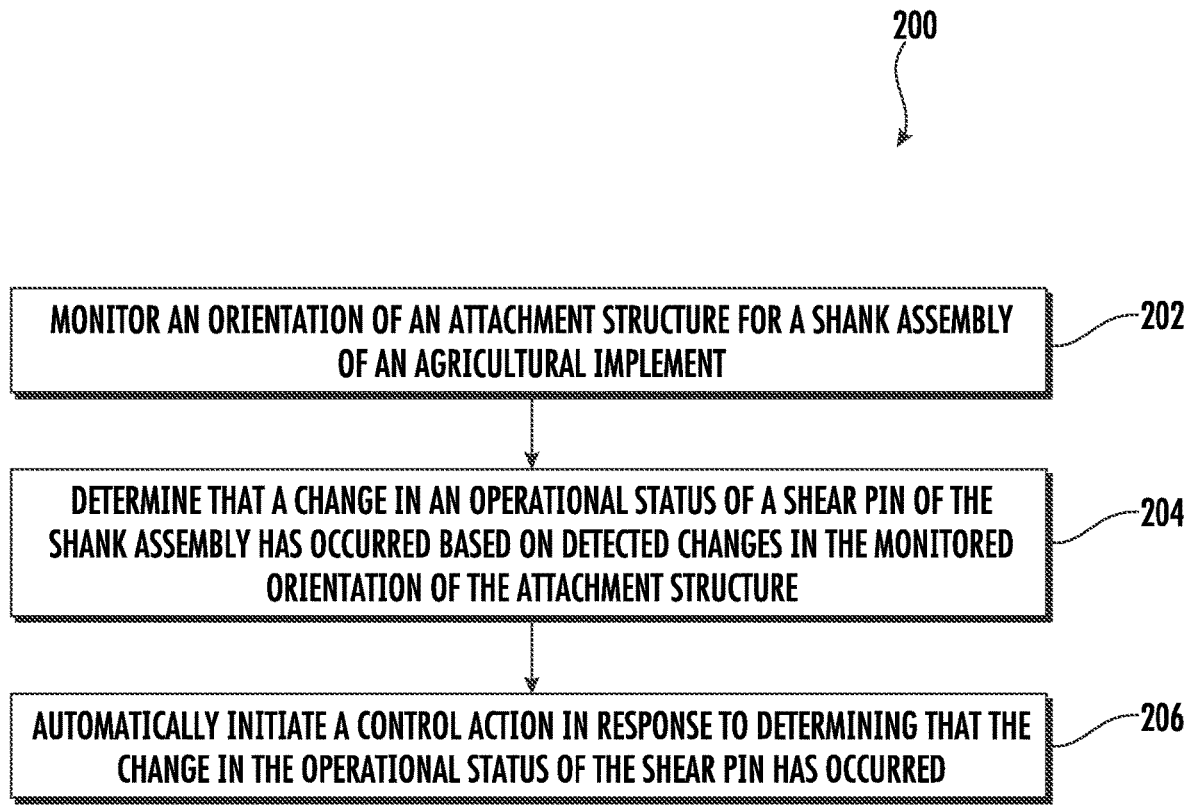
FIG. 5 illustrates a flow diagram of one embodiment of a method for monitoring the operational status of a shear pin for a ground-engaging assembly of an agricultural implement in accordance with aspects of the present subject matter.

Referring now to FIG. 5, a flow diagram of one embodiment of a method 200 for monitoring the operational status of a shear pin for a ground-engaging assembly of an agricultural implement is illustrated in accordance with aspects of the present subject matter. In general, the method 200 will be described herein with reference to the implement 10 and the work vehicle 12 shown in FIGS. 1 and 2, the shank assembly 60 described above with reference to FIG. 3, and the various components of the system 100 described with reference to FIG. 4. However, it should be appreciated that the disclosed method 200 may be implemented with work vehicles and/or implements having any other suitable configurations, ground-engaging assemblies having any other tool/assembly configuration, and/or within systems having any other suitable system configuration. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the method disclosed herein can be omitted, rearranged, combined, and/or adapted in various ways without deviating from the scope of the present disclosure.

As shown in FIG. 5, at (202), the method 200 may include monitoring an orientation of an attachment structure for a shank assembly of an agricultural implement. For instance, as indicated above, the computing system 110 may be communicatively coupled to one or more orientation sensors 102 configured to generate data indicative of the orientation of the attachment structure 61 of a given shank assembly 60. Thus, by receiving such data from the sensor(s) 102, the computing system 110 may be configured to monitor the orientation of the attachment structure 61 of such shank assembly 60.

Additionally, at (204), the method 200 may include determining that a change in an operational status of a shear pin of the shank assembly has occurred based on detected changes in the monitored orientation of the attachment structure. For instance, as indicated above, the computing system 110 may be configured to compare the monitored orientation of the attachment structure of a given shank assembly 60 to a predetermined operational range or threshold to determine or infer when the operational status of the associated shear pin 90 has changed, such as by comparing the monitored orientation to an expected or predetermined orientation range set for the attachment structure and/or by comparing a rate-of-change of the monitored orientation to rate-of-change threshold set for the attachment structure.

Moreover, at (206), the method 200 may include automatically initiating a control action in response to determining that the change in the operational status of the shear pin has occurred. As indicated above, in one embodiment, the computing system 110 may be configured to automatically generate an operator notification associated with the operational status of the shear pin, such as by providing the operator a notification that the shear pin has failed. In addition to such operator notifications and/or as an alternative thereto, the computing system 110 may be configured to automatically control the operation of the implement 10 and/or the associated tow vehicle 12, such as by controlling the operation of one or more drive components 130 of the vehicle 12 to reduce the operating speed of the implement 10 (e.g., by reducing the speed to zero to bring the implement 10 to a stop).

It is to be understood that the steps of the method 200 are performed by the computing system 110 upon loading and executing software code or instructions which are tangibly stored on a tangible computer readable medium, such as on a magnetic medium, e.g., a computer hard drive, an optical medium, e.g., an optical disk, solid-state memory, e.g., flash memory, or other storage media known in the art. Thus, any of the functionality performed by the computing system 110 described herein, such as the method 200, is implemented in software code or instructions which are tangibly stored on a tangible computer readable medium. The computing system 110 loads the software code or instructions via a direct interface with the computer readable medium or via a wired and/or wireless network. Upon loading and executing such software code or instructions by the computing system 110, the computing system 110 may perform any of the functionality of the computing system 110 described herein, including any steps of the method 200 described herein.

The term "software code" or "code" used herein refers to any instructions or set of instructions that influence the operation of a computer or computing system. They may exist in a computer-executable form, such as machine code, which is the set of instructions and data directly executed by a computer's central processing unit or by a computing system, a human-understandable form, such as source code, which may be compiled in order to be executed by a computer's central processing unit or by a computing system, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a computing system.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A system for monitoring the operational status of shear pins for ground-engaging assemblies of agricultural implements, the system comprising:
   a ground-engaging assembly, comprising:
      an attachment structure pivotably coupling the ground-engaging assembly to a frame of an agricultural implement;
      a ground-engaging tool pivotably coupled to the attachment structure at a pivot joint; and
      a shear pin at least partially extending through the attachment structure and the ground-engaging tool to prevent pivoting of the ground-engaging tool about the pivot joint;
   an orientation sensor configured to detect an orientation of the attachment structure as the attachment structure pivots relative to the frame; and
   a computing system communicatively coupled to the orientation sensor, the computing system being configured to monitor the orientation of the attachment structure and determine a change in an operational status of the shear pin based on detected changes in the monitored orientation of the attachment structure.

2. The system of claim 1, wherein the computing system is configured to determine that the shear pin has failed based on detected changes in the monitored orientation of the attachment structure.

3. The system of claim 1, wherein the computing system is configured to compare the monitored orientation of the attachment structure to a predetermined orientation range set for the attachment structure, the computing system being configured to determine that a change in the operational status of the shear pin has occurred when it is detected that the monitored orientation of the attachment structure falls outside the predetermined orientation range.

4. The system of claim 1, wherein the computing system is configured to compare a rate-of-change of the monitored orientation of the attachment structure to a predetermined rate-of-change threshold set for the attachment structure, the computing system being configured to determine that a change in the operational status of the shear pin has occurred when it is detected that the rate-of-change of the monitored orientation exceeds the predetermined rate-of-change threshold.

5. The system of claim 1, wherein the computing system is further configured to automatically initiate a control action when it is determined that the operational status of the shear pin has changed.

6. The system of claim 5, wherein the control action comprises generation of an operator notification or a reduction in an operating speed of the agricultural implement.

7. The system of claim 1, wherein the orientation sensor comprises a local orientation sensor or a global orientation sensor.

8. The system of claim 1, wherein the ground-engaging assembly further comprises a biasing element configured to bias the ground-engaging tool towards a ground-engaging position.

9. The system of claim 1, wherein the agricultural implement comprises a tillage implement and the ground-engaging tool comprises a shank of the tillage implement.

10. An agricultural implement, comprising:
    a frame;
    a plurality of shank assemblies supported relative to the frame, each shank assembly comprising:
       an attachment structure pivotably coupling the shank assembly to the frame;
       a shank pivotably coupled to the attachment structure at a pivot joint;
       a shear pin at least partially extending through the attachment structure and the shank to prevent pivoting of the shank about the pivot joint; and
       a biasing element coupled between the frame and the attachment structure, the biasing element being configured to bias the shank towards a ground-engaging position;
    a plurality of orientation sensors, each orientation sensor being configured to detect an orientation of the attachment structure of a respective shank assembly of the plurality of shank assemblies as the attachment structure of the respective shank assembly pivots relative to the frame; and
    a computing system communicatively coupled to the plurality of orientation sensors, the computing system being configured to monitor the orientation of the attachment structure of each of the plurality of shank assemblies and determine a change in an operational status of the shear pin of a given shank assembly of the plurality of shank assemblies based on detected changes in the monitored orientation of the attachment structure of the given shank assembly.

11. The agricultural implement of claim 9, wherein the computing system is configured to determine that the shear pin of the given shank assembly has failed based on detected changes in the monitored orientation of the attachment structure of the given shank assembly.

12. The agricultural implement of claim 9, wherein the computing system is configured to compare the monitored orientation of the attachment structure of each of the plurality of shank assemblies to a predetermined orientation range set for said attachment structure, the computing system being configured to determine that a change in the operational status of the shear pin of the given shank assembly has occurred when it is detected that the monitored orientation of the attachment structure of the given shank assembly falls outside the predetermined orientation range.

13. The agricultural implement of claim 9, wherein the computing system is configured to compare a rate-of-change of the monitored orientation of the attachment structure of each of the plurality of shank assemblies to a predetermined rate-of-change threshold set for the attachment structure, the computing system being configured to determine that a change in the operational status of the shear pin of the given shank assembly has occurred when it is detected that the rate-of-change of the monitored orientation exceeds the predetermined rate-of-change threshold.

14. The agricultural implement of claim 9, wherein the computing system is further configured to automatically initiate a control action when it is determined that the operational status of the shear pin of the given shank assembly has changed.

15. The agricultural implement of claim 9, wherein the orientation sensor comprises a local orientation sensor or a global orientation sensor.

16. A method for monitoring the operational status of a shear pin for a ground-engaging assembly of an agricultural implement, the ground-engaging assembly including an attachment structure pivotably coupling the ground-engaging assembly to a frame of the agricultural implement, a ground-engaging tool pivotably coupled to the attachment structure at a pivot joint, and a shear pin at least partially extending through the attachment structure and the ground-engaging tool to prevent pivoting of the ground-engaging tool about the pivot joint, the method comprising:

receiving, with a computing system, sensor data from an orientation sensor configured to detect an orientation of the attachment structure as the attachment structure pivots relative to the frame;

monitoring, with the computing system, the orientation of the attachment structure of the shank assembly based on the sensor data received from the orientation sensor;

determining, with the computing system, that a change in an operational status of the shear pin of the shank assembly has occurred based on detected changes in the monitored orientation of the attachment structure; and automatically initiating, with the computing system, a control action in response to determining that the change in the operational status of the shear pin of the shank assembly has occurred.

17. The method of claim 16, wherein determining that the change in the operational status of the shear pin of the shank assembly has occurred comprises:

comparing the monitored orientation of the attachment structure to a predetermined orientation range set for the attachment structure; and determining that the change in the operational status of the shear pin has occurred when it is detected that the monitored orientation of the attachment structure falls outside the predetermined orientation range.

18. The method of claim 16, wherein determining that the change in the operational status of the shear pin of the shank assembly has occurred comprises:

comparing a rate-of-change of the monitored orientation of the attachment structure to a predetermined rate-of-change threshold set for the attachment structure; and determining that the change in the operational status of the shear pin has occurred when it is detected that the rate-of-change of the monitored orientation exceeds the predetermined rate-of-change threshold.

19. The method of claim 16, wherein automatically initiating the control action comprises generating an operator notification associated with the operational status of the shear pin.

20. The method of claim 16, wherein automatically initiating the control action comprises automatically reducing an operating speed of the agricultural implement.

\* \* \* \* \*